Patented Aug. 30, 1938

2,128,334

UNITED STATES PATENT OFFICE 2,128,334

ULTRAVIOLET LIGHT FILTER COMPOSITION

Frits E. Stockelbach, Montclair, N. J.

No Drawing. Application April 17, 1937,
Serial No. 137,497

7 Claims. (Cl. 167—90)

My present invention relates to a class of new chemical compounds and to their application as light filters for absorption of rays having wave lengths between approximately 2900 and 3200 Ångström units. More specifically it is directed to such compounds which are water soluble, non-irritating to the skin, relatively stable when exposed to such rays and which can be readily and cheaply prepared; hence it is directed to compositions especially adaptable for use in a lotion for preventing sunburn, reddening and blistering of the skin upon exposure to the sun.

In United States Patent No. 2,041,874, granted to me, there is disclosed the virtues and advantages of menthyl salicylate as a sunburn preventing means. Menthyl salicylate, however, is insoluble in water and hence must be incorporated in an oil or dissolved in alcohol for use in cosmetics and lotions. In many cases it is desirable to use an ultraviolet filtering composition which is water soluble, and this is particularly so where the sunburn preventing composition is to be dispensed from a vending machine adapted to deliver said composition in the form of a fine spray which can be directly applied to the parts of the body to be exposed to the sun. Oily solutions are at a disadvantage under such conditions, and alcoholic solutions are excluded because of their inflammability.

A number of water soluble substances which have the property of screening ultraviolet rays having wave lengths between 2900 and 3200 Ångström units are, of course, known and used to some extent but nearly all of said substances have certain drawbacks. For example, quinine bisulphate, which is quite effective, has a decidedly acid reaction and is liable to cause irritation. It is also very bitter and hence objectionable when the lotion is atomized and accidentally touches the lips of the user. Resorcin gives only inadequate protection, while R-salt quickly deteriorates when exposed to ultraviolet light and thereby soon loses its obscuring effect.

Knowing that the salicylates as a class possess the property of ultraviolet light absorption to various degrees, I experimented with this class of compounds and have found that the reaction product of salicylic acid with trihydroxy-triethylamine, namely, trihydroxy-triethylamine-salicylate, which is water soluble, possesses this absorption property of ultraviolet light to a marked degree. This was established by preparing a lotion by dissolving 15 parts of trihydroxy-triethylamine-salicylate in 85 parts of water and determining the transmission factor thereof. To do this, a film of about .08 to .1 mm thickness, the normal thickness of a film which would be applied to the skin, was found to absorb about 92% of the light rays between the lines of the spectrum indicated by the wave lengths 2900 to 3200 Ångström units. While this is not quite equal to the protection afforded by menthyl salicylate, practical tests made by application of this solution to the skin and exposure to ultraviolet light established the fact that the protection afforded by this compound is quite adequate and furthermore, that it promotes the tan pigmentation of the skin whereby additional protection to the ultraviolet rays is obtainable.

In view of the success obtained with trihydroxy-triethylamine-salicylate, I extended my researches to other compounds having the same organic base and found that the salts formed with ortho-cresotinic acid and with ortho-beta-hydroxy-naphthoic acid also possessed the desirable properties of the salicylate with respect to water solubility and ultraviolet light absorption, as described in the preceding paragraph.

In use as a preventive for sunburn and as an aid in promoting tan pigmentation of the skin upon exposure to the sun, the various trihydroxy-triethyl-amine salts which I have prepared and each of which is a thick, viscous liquid soluble in both water and in alcohol, and miscible with ethylene glycol, diethylene glycol and glycerine, may be applied in either pure or diluted form directly to the skin before exposure, or it may be applied after being made up into a suitable lotion with any of the aforementioned solvents or miscible substances, or as a cosmetic by admixture with suitable waxes and oils to form a cream of proper consistency. In whatever manner of application the various aforementioned salts are applied to the skin, their effectiveness is primarily due to the film of the particular salt which forms on the skin upon evaporation or absorption of the solvent or miscible liquid, which film functions as an absorptive medium, screen or shield against penetration therethrough of ultraviolet light having wave lengths between approximately 2900 and 3200 Ångström units. As hereinbefore stated, the various salts also function when thus applied in promoting tan pigmentation of the skin under the influence of light because of the presence of the amino group in said compounds.

Although the proportion of the hereinbefore described light filter compounds in the lotion, cream or other vehicle may vary considerably, I have found that a lotion containing approximately 15% of any of said light filter compounds possesses the desirable sunburn preventing and tan pigmentating properties to a marked degree.

Trihydroxy-triethylamine-salicylate to my knowledge is a new chemical compound, and I have prepared said compound in the following manner: To 135 parts by weight of trihydroxy-triethyl-amine of a good commercial grade at about 20° C., there were added about 138 parts of salicylic acid. The mixture was stirred in an open vessel until the acid completely dissolved and the resulting salt was formed. This salt, namely, trihydroxy-triethylamine-salicylate, is a reddish-brown viscous liquid which has a slight acid reaction and a pH value of approximately 6 in a 5% water solution.

The trihydroxy-triethylamine-ortho-cresotinate and the trihydroxy-triethylamine-ortho-beta-hydroxy-naphthoate, which to my knowledge are also new chemical compounds, were prepared in substantially the same manner as described hereinbefore with respect to the salicylate by using approximately the molecular weights of the various reacting substances after making due allowance for commercial grades of materials used. These compounds were likewise tested in the same manner as the salicylate to determine their transmission factors of ultraviolet light, and it was found that in a concentration of 10% dissolved in water, both these salts caused almost complete obscuration of the wave length between 2900 and 3200 Ångström units. The trihydroxy-triethylamine-ortho-beta-hydroxy-naphthoate is a light yellow crystalline powder having a melting point of 125°–126° C.

It will be noted that in the various acids which I have employed in forming the ultraviolet light filter compositions, the hydroxyl and the carboxyl groups are in ortho relation to one another. From this I concluded that this particular configuration or relationship in the acid might be controlling with respect to the characteristic of the ultraviolet light absorption, and in order to test out this theory I prepared a salt by reacting para-hydroxy-benzoic acid with trihydroxy-triethylamine, the said compound being an isomer of the salicylate hereinbefore discussed. A 10% solution of this para acid compound was prepared, and upon being tested was found to transmit about 85% of the wave lengths between 2900 and 3200 Ångström units and was only effective in absorbing about 15% of light between said wave lengths. This would appear to substantiate my hypothesis that the screening or obscuring effect obtained through such salts is greatest where the hydroxyl and carboxyl groups are in ortho relation to one another.

Having now fully and completely described my invention, and the manner in which it is to be used, I do not desire to be limited to any specific manner or mode of application of the designated compounds to the skin for the purposes described, and hence in the appended claims where I have used the term "vehicle" it is to be understood that said term includes any solvent, oil, cream or other medium which serves as a carrier for the salt for facilitating its application to, and disposition upon, the skin of a user. It will also be appreciated that the various salts enumerated are not limited in their application to preventing sunburn or in aiding tan pigmentation of the skin, but may also be used wherever an ultraviolet light filter is required for absorbing the rays having wave lengths between approximately 2900 and 3200 Ångström units; for example, as a film upon any normal light transmitting medium.

What I claim is:

1. An ultraviolet light filter for rays having wave lengths between approximately 2900 to 3200 Ångström units, comprising a film of a compound having the following formula:

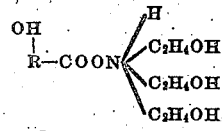

wherein R is a benzene or naphthalene nucleus, and the hydroxyl group which is linked to the nucleus and the carboxyl group are in ortho relation.

2. An ultraviolet light filter for rays having wave length between approximately 2900 to 3200 Ångström units comprising a film of the compound trihydroxy-triethylamine-salicylate.

3. An ultraviolet light filter for rays having wave lengths between approximately 2900 to 3200 Ångström units comprising a film of the compound trihydroxy-triethylamine-ortho-cresotinate.

4. An ultraviolet light filter for rays having wave lengths between approximately 2900 to 3200 Ångström units comprising a film of the compound trihydroxy-triethylamine-ortho-beta-hydroxy naphthoate.

5. A cosmetic for preventing sunburn, comprising a compound having the following formula:

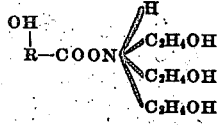

wherein R is a benzene or naphthalene nucleus and the hydroxyl group which is linked to the nucleus and carboxyl group are in ortho relation.

6. A cosmetic for preventing sunburn, comprising approximately 15% of a compound having the following formula:

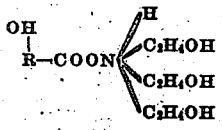

in a vehicle, and where R is a benzene or naphthalene nucleus and the hydroxyl group which is linked to the nucleus and carboxyl group are in ortho relation.

7. The compound trihydroxy-triethylamine-ortho-beta-hydroxy-naphthoate.

FRITS E. STOCKELBACH.